United States Patent
Zhu

(10) Patent No.: US 9,292,326 B2
(45) Date of Patent: Mar. 22, 2016

(54) SYNCHRONIZING MULTICAST GROUPS

(71) Applicant: Lenovo Enterprise Solutions (Singapore) Pte. Ltd., Singapore (SG)

(72) Inventor: Zheng D. Zhu, Wuxi (CN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 52 days.

(21) Appl. No.: 14/188,155

(22) Filed: Feb. 24, 2014

(65) Prior Publication Data

US 2014/0245302 A1 Aug. 28, 2014

(30) Foreign Application Priority Data

Feb. 27, 2013 (CN) .......................... 2013 1 0062234

(51) Int. Cl.
- *G06F 9/455* (2006.01)
- *G06F 17/30* (2006.01)
- *H04L 12/18* (2006.01)

(52) U.S. Cl.
CPC ........ *G06F 9/45533* (2013.01); *G06F 9/45558* (2013.01); *G06F 17/30424* (2013.01); *G06F 2009/4557* (2013.01); *G06F 2009/45595* (2013.01); *H04L 12/185* (2013.01)

(58) Field of Classification Search
CPC ............................................ G06F 2009/45595
See application file for complete search history.

(56) References Cited

U.S. PATENT DOCUMENTS

| | | | |
|---|---|---|---|
| 2010/0242045 A1 | 9/2010 | Swamy et al. | |
| 2011/0205904 A1 | 8/2011 | Nakagawa | |
| 2012/0110181 A1 | 5/2012 | Tsirkin | |
| 2012/0246282 A1 | 9/2012 | Oguchi | |
| 2013/0128774 A1* | 5/2013 | Singh et al. | 370/256 |
| 2014/0223435 A1* | 8/2014 | Chang | 718/1 |

FOREIGN PATENT DOCUMENTS

| | | |
|---|---|---|
| CN | 1540935 | 10/1990 |
| CN | 1878121 | 12/2006 |
| CN | 101145922 | 3/2008 |
| CN | 102394831 | 3/2012 |
| CN | WO2012094898 A1 | 7/2012 |
| JP | WO2011087122 A1 | 7/2011 |

OTHER PUBLICATIONS

Kadav et al., Live Migration of Direct-Access Devices, Computer Sciences Department, University of Wisconsin-Madison, Jul. 2009, pp. 1-7, vol. 43 Issue 3.

* cited by examiner

*Primary Examiner* — Hang Pan
(74) *Attorney, Agent, or Firm* — Lieberman & Brandsdorfer, LLC

(57) ABSTRACT

Embodiments of the invention relate to synchronizing multicast groups of a virtual machine during migration of the virtual machine. A first list and a second list, indicating multicast groups corresponding to the first port and second port respectively, are obtained in response to detection of migration of the virtual machine from a first port to a second port of a same switch. The second list is updated so that the second list contains the multicast groups in the first list. An undesired multicast group is aged. Multicast groups of a virtual machine may be synchronized in the process of migration of the virtual machine, thereby reducing or removing the time during which the virtual machine multicast service is disrupted.

16 Claims, 5 Drawing Sheets

SYNCHRONIZING MULTICAST GROUPS

BACKGROUND

The present invention relates to multicast services of a virtual machine. More specifically, the invention relates to synchronizing multicast groups during migration of the virtual machine.

With the development of virtual technology, a virtual machine can provide various applications and services like a true, independent computer. Since a virtual machine obtains its running environment completely through software simulation, a plurality of virtual machines may be installed on a same physical platform, such as a server, and the plurality of virtual machines may run in parallel, independently of and isolated from one another.

SUMMARY

The invention includes a computer program product and apparatus for synchronizing multicast groups of a virtual machine.

In one aspect, an apparatus is provided for synchronizing multicast groups of a virtual machine. A list obtaining unit is provided to obtain lists to support migration of virtual machines, and specifically in response to detection of migration of the virtual machine from a first port to a second port of a same switch. The unit obtains a first list indicating multicast groups corresponding to the first port, and also obtains a second list indicating multicast groups corresponding to the second port. An updating unit is provided to update the second list so that the second list contains the multicast groups in the first list. An aging unit is provided to age an undesired multicast group.

In another aspect, a computer program product is provided for synchronizing multicast groups of a virtual machine. The computer program product includes a computer readable storage device having program code executable by a processing unit. Program code is provided to detect migration of the virtual machine from a first port to a second port of a same switch, and to obtain two lists. A first list indicates multicast groups corresponding to the first port; a second list indicates multicast groups corresponding to the second port. The program code updates the second list so that the second list contains the multicast groups in the first list. Thereafter, the program code ages an undesired multicast group.

Other features and advantages of this invention will become apparent from the following detailed description of the presently preferred embodiment of the invention, take in conjunction with the accompanying drawings.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same component in the embodiments of the present disclosure.

DETAILED DESCRIPTION

Figure 1:
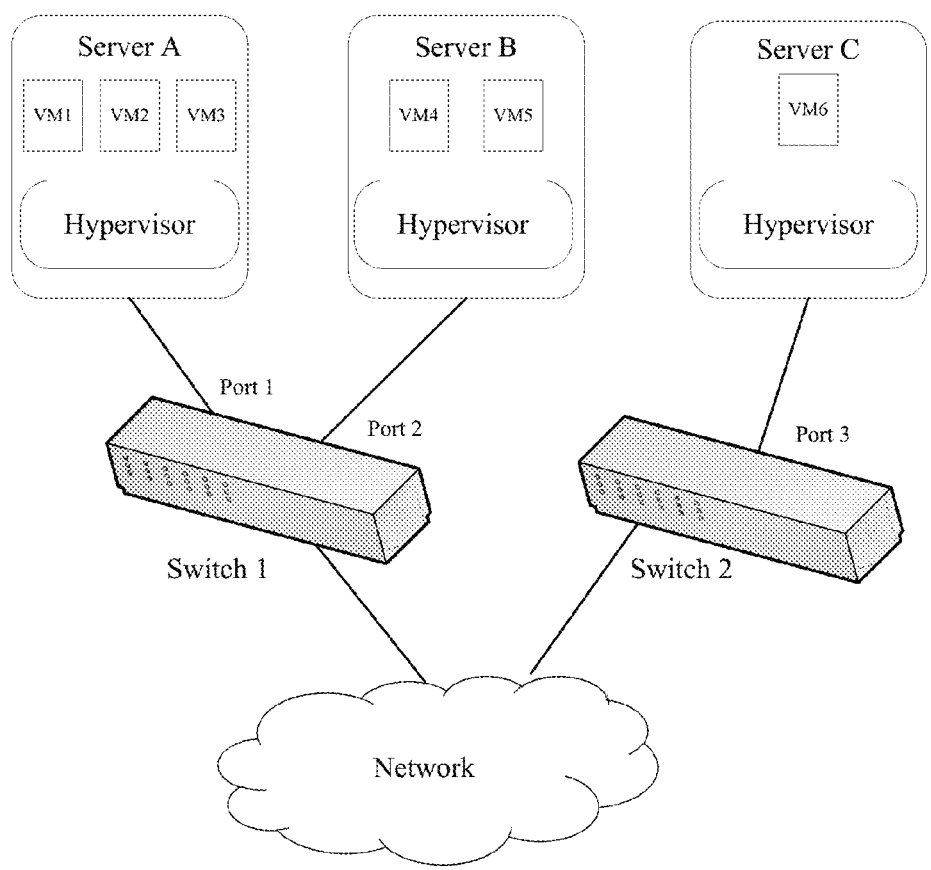
FIG. 1 depicts a structure diagram of a virtual machine network.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a structure diagram of a typical virtual machine network. Shown in FIG. 1 are three physical platforms, respectively, servers A, B and C. At the bottom of each physical platform, there runs hypervisor on which one or more virtual machines may be installed according to needs. For example, in the example in FIG. 1, server A has three virtual machines installed thereon, i.e., VM1, VM2 and VM3. Server B and server C have two virtual machines and one virtual machine installed thereon respectively.

In a typical network connection structure, each server is connected to a (Ethernet) switch through a port, and then connected to an external network via the switch. For example, in the example in FIG. 1, server A and server B are connected to the same switch 1 through port 1 and port 2, respectively, and server C is connected to another switch 2 through port 3. By establishing communication channels through switches 1 and 2, respective servers A, B, and C may be connected to an external backbone network. Accordingly, respective virtual machines running on these servers are also connected to the network through switches 1 and 2, as independent hosts.

As known to those skilled in the art, with the development of broadband multimedia networks, various broadband network applications emerge continuously, such as IP TV, video conference, network video application, etc. These network applications challenge carrying capacity of multimedia networks. To solve this problem, multicast transmission is proposed. In this transmission mode, a plurality of receivers may form a multicast group, and implement a point-to-multipoint network connection with a sender, such as a multicast source. Since a virtual machine may be connected to a network for communication, as a regular host, it may also join one or more multicast groups as a member to receive multicast traffic data from the multicast source. In this case, a Group Membership Protocol is maintained between virtual machines and switches, so that the switches distribute data of the multicast group(s) to corresponding ports, and then to corresponding virtual machines.

On the other hand, in order to improve security and persistence of data storage, a lot of data centers use virtual machines across platforms or sites for execution and management. In the case of site maintenance, power adjustment, load balance between sites and the like, there is a need for migrating a virtual machine carried in a platform, namely, migrating the virtual machine from one physical system to a different physical system. Currently, most companies providing host virtualization have their own particular VM migration tools, and support live migration of virtual machines.

In the process of migration of a virtual machine from one physical platform to another physical platform, in order to guarantee that the network service of the virtual machine is not disrupted, a switch associated with the virtual machine needs to update its network configuration. As to static configuration at the switch side, such as, Access Control List ACL, quality of service QoS, virtual local area network VLAN, etc., there have been proposed some methods in the prior art to detect the migration of the virtual machine, and to immediately configure the above static strategy. However, information related to a multicast group the virtual machine joins is information generated dynamically by the virtual machine in the running process. Migration tools in the prior art cannot migrate such dynamically generated information along with the migration of the virtual machine. On the other hand, the migration of the virtual machine is transparent to the virtual machine itself completely; that is to say, the virtual machine itself is unable to perceive the migration. Therefore, the virtual machine cannot report its multicast group related information to the switch into which it is migrated immediately and actively upon completion of the migration. In general, only if the virtual machine receives a multicast group member query from the switch, it can inform the switch its multicast group information by replying a message. However, there is a certain time interval for the above query. In a typical situation in the prior art, the above time interval is about 100-200 seconds. This means that, in the worst case, during the above time interval, the switch cannot distribute multicast group traffic data needed by the virtual machine to the virtual machine, so that the multicast service of the virtual machine will be disrupted for 100-200 seconds, affecting the service performance.

Figure 2:
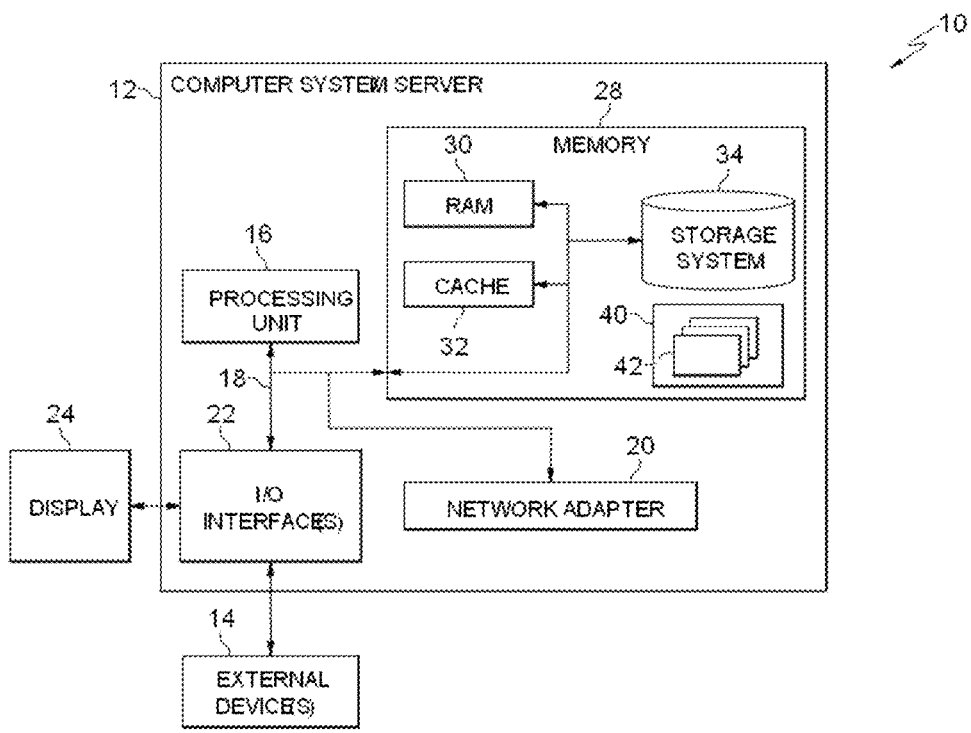
FIG. 2 depicts a block diagram illustrating an exemplary computer system/server which is applicable to implement the embodiments of the present invention.

Referring now to FIG. 2, in which an exemplary computer system/server (12) which is applicable to implement the embodiments of the present invention is shown. Computer system/server (12) is only illustrative and is not intended to suggest any limitation as to the scope of use or functionality of embodiments of the invention described herein.

As shown in FIG. 2, computer system/server (12) is shown in the form of a general-purpose computing device. The components of computer system/server (12) may include, but are not limited to, one or more processors or processing units (16), a system memory (28), and a bus (18) that couples various system components including system memory (28) to processor (16).

Bus (18) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory (RAM) (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of embodiments of the invention.

Program/utility (40), having a set (at least one) of program modules (42), may be stored in memory (28) by way of example, and not limitation, as well as an operating system, one or more application programs, other program modules, and program data. Each of the operating system, one or more application programs, other program modules, and program data or some combination thereof, may include an implementation of a networking environment. Program modules (42) generally carry out the functions and/or methodologies of embodiments of the invention as described herein.

Computer system/server (12) may also communicate with one or more external devices (14) such as a keyboard, a pointing device, a display (24), etc., one or more devices that enable a user to interact with computer system/server (12); and/or any devices (e.g., network card, modem, etc.) that enable computer system/server (12) to communicate with one or more other computing devices. Such communication can occur via Input/Output (I/O) interfaces (22). Still yet, computer system/server (12) can communicate with one or more networks such as a local area network (LAN), a general wide area network (WAN), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

The embodiments of the present invention will be described in combination with the accompanying drawings and specific examples. In the embodiments of the present invention, once it is detected that a virtual machine is migrated from one port to another port of a same switch, all the multicast group information of the old port is immediately provided to the new port so that a multicast group list corresponding to the new port contains all the multicast groups of the old port. Thus, after the virtual machine is migrated to the new port, it can immediately obtain needed multicast service from the new port so that the multicast service will not be disrupted due to the migration of the virtual machine.

Figure 3:
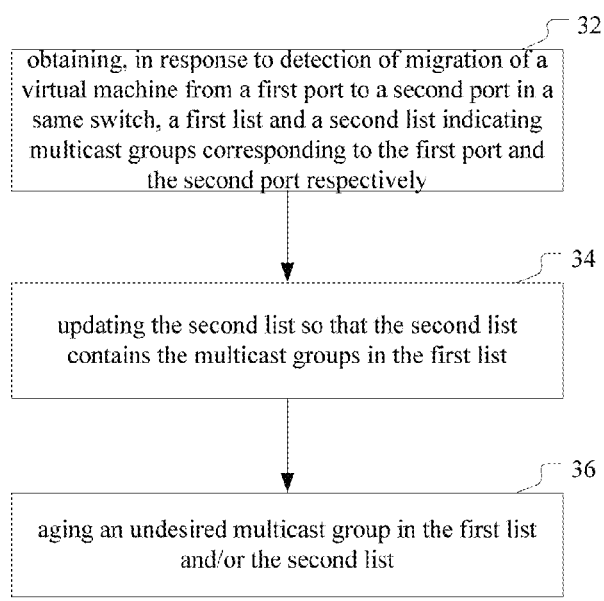
FIG. 3 depicts a flow chart illustrating a process for synchronizing multicast groups according to an embodiment of the present invention.

With reference now to FIG. 3, it shows a flow chart of a method for synchronizing multicast groups according to an embodiment of the present invention. As shown in FIG. 3, the method for synchronizing multicast groups according to the embodiment comprises: step (32) of obtaining, in response to detection of migration of the virtual machine from a first port to a second port of a same switch, a first list indicating multicast groups corresponding to the first port and a second list indicating multicast groups corresponding to the second port; step (34) of updating the second list so that the second list contains the multicast groups in the first list; and step (36) of aging undesired multicast groups in the first and/or second list. The way to execute the above steps will be described below in combination with specific examples.

Figure 4:
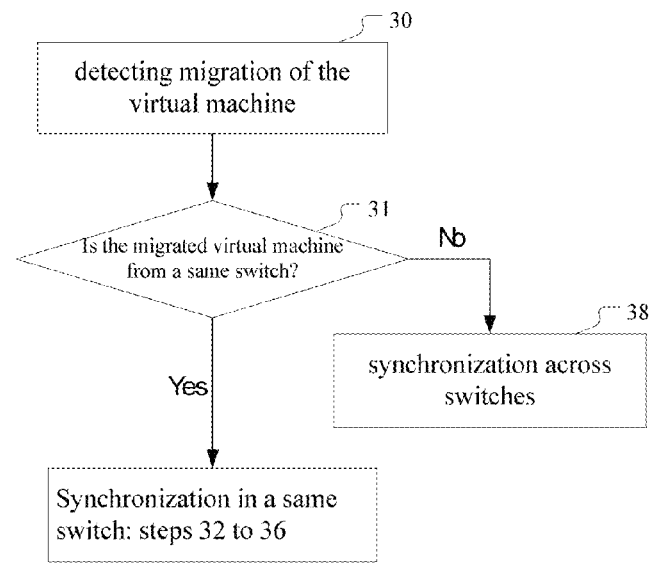
FIG. 4 depicts a flow chart illustrating a process according to another embodiment of the present invention.

According to one embodiment, the method of the invention begins in step (32) of obtaining, in response to detection of migration of the virtual machine, the first list and the second list for indicating multicast groups corresponding to the original port and the new port, respectively. According to another embodiment, the method of the invention executes additional steps before step (32), so as to provide a basis for execution of step (32). FIG. 4 shows a flow chart of a method according to another embodiment. As shown in FIG. 4, the method of this embodiment additionally comprises step (30) of detecting migration of the virtual machine and step (31) of judging whether the migrated virtual machine is from a same switch. Both step (30) and step (31) may be implemented by methods in the prior art.

Specifically, in step (30), the migration of the virtual machine is detected. As known to those skilled in the art, in order to solve the problem of network edge virtualization, bridge virtualization technology is developed, in which IEEE 802.1Qbg standard is proposed. In this standard, VSI (virtual station interface) discovery and configuration protocol VDP is developed for discovering and configuring VSI. By using the VDP protocol, when migration of a virtual machine happens, the switch to which the virtual machine is migrated can find VSI of the virtual machine quickly, and then detect the migration of the virtual machine. In addition to using VDP protocol for migration detection, other solutions in the prior art or proposed in the future may also be used to detect migration of the virtual machine. For example, in one example, a virtual machine migration tool may issue a notice to switches involved before and after the migration of the virtual machine. By receiving such notice, the switch to which the virtual machine is migrated may detect the migration of the virtual machine.

Based on the detection of the migrated virtual machine, it is judged in step (31) whether the migrated virtual machine is from a same switch. In one embodiment, the switch to which the virtual machine is migrated judges, using the VDP protocol previously described, whether the virtual machine is migrated from the same switch. Specifically, the VDP protocol performs identification and association with respect to VSI of the virtual machine, wherein identification information of VSI comprises corresponding VLAN ID, MAC address, VSI type and the like. With such information, the switch can recognize whether the virtual machine migrated in is from the same switch. In addition, other solutions in the prior art may also be used to perform the judgment in step (31).

If the judgment result of step (31) is yes, namely, the virtual machine is migrated within a same switch, just from one port of the same switch to another port, then synchronization steps in the case of the same switch, namely, steps (32) to (36) in FIG. 3, are executed. If the judgment result of step (31) is no, namely, the virtual machine is migrated across switches, then step (38), namely, the synchronization step in the case of crossing switches, is executed.

Figure 5:
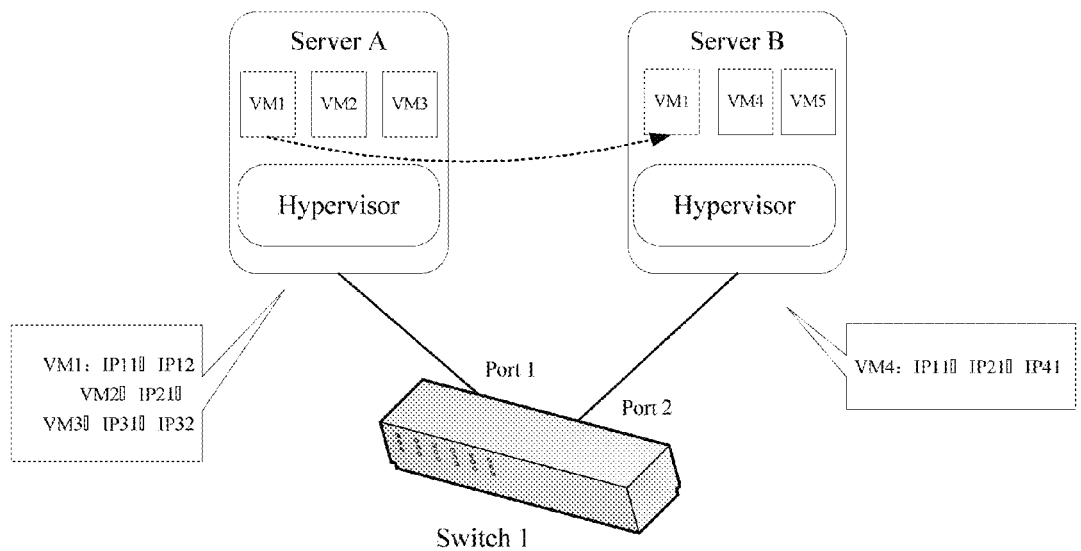
FIG. 5 depicts a schematic diagram of migration of a virtual machine within a same switch.

Next, the migration within the same switch is described first. In the diagram in FIG. 1, servers A and B are connected to switch 1 together. Thus, if the virtual machine is migrated between server A and server B, this belongs to a migration within the same switch. FIG. 5 shows a schematic diagram of migration of a virtual machine within the same switch more clearly. Specifically, FIG. 5 merely shows switch 1, servers A and B, and related virtual machines of FIG. 1, and assumes that virtual machine VM1 is migrated from server A to server B. Since server A is connected to port 1 of the switch and server B is connected to port 2 of the switch, then, for switch 1, the virtual machine VM1 is migrated from a first port, i.e., port 1, to a second port, i.e., port 2.

In order to synchronize multicast groups of the virtual machine in the above case, in step (32), in response to the migration of the virtual machine from the first port to the second port in the same switch, a first list of multicast groups corresponding to the first port and a second list of multicast groups corresponding to the second port are obtained. As known to those skilled in the art, in order to enable individual hosts, including virtual machines, to obtain multicast services, it is required in the prior art to maintain a group membership protocol between the hosts and multicast routers directly connected with the hosts. In a typical embodiment, the above protocol is Internet Group Management Protocol IGMP. The IGMP protocol runs in the network layer. The switch performs multicast in the data link layer under the network layer by executing an IGMP Snooping mechanism. According to the mechanism, the switch forms a correspondence relationship between multicast group and switch port by snooping IGMP messages transferred between hosts and routers. The correspondence relationship may be maintained in the form of a correspondence list. According to the correspondence relationship, the switch forwards received multicast data packets to a port having corresponding multicast groups. That is to say, the switch can know which port corresponds to which multicast group, but does not care about which virtual machine carried by this port needs the multicast group. Since the switch maintains correspondence relationships between multicast groups and each port, then in step (32), a list of multicast groups corresponding to the first port, namely the first list, and a list of multicast groups corresponding to the second port, namely, the second list, may be obtained easily based on the above correspondence relationships.

In the example of FIG. 5, the first port above is the original port of virtual machine VM1, port 1. Since port 1 carries three virtual machines, VM1, VM2, VM3, then multicast groups corresponding to port 1, namely the first list, contains multicast groups VM1 joins, such as IP11, IP12, multicast group VM2 joins, such as IP21, and multicast groups VM3 joins, such as IP31, IP32. It may be appreciated that each multicast group has its own unique identifier. In general, a multicast IP address is used to identify an IP multicast group. In the case of migration of virtual machine VM1, the second port is the target port into which VM1 is migrated, port 2. Initially, port 2 carries two virtual machines, VM4 and VM5, whereby multicast groups corresponding to port 2, namely the second list, initially contains multicast groups VM4 joins and multicast groups VM5 joins. In one example, multicast groups VM4 joins include IP11, IP21 and IP41, while VM5 does not join any multicast group. That is to say, both VM4 and VM1 join the same multicast group IP11, both VM4 and VM2 join the multicast group IP21, and VM4 further additionally joins the multicast group IP41. In this case, the second list initially contains IP11, IP21 and IP41.

As mentioned before, the switch only maintains the correspondence relationship between multicast group and port, but is unaware of correspondence relationship between multicast group and virtual machine. Therefore, after virtual machine VM1 is migrated to server B, the switch could not immediately determine which multicast groups the virtual machine needs. Therefore, in step (34), the first list above is provided to the second port and based on this the second list is updated to make the second list contain all multicast groups in the first list. That is to say, since the switch is unable to determine which multicast groups in the first list are needed by the migrated virtual machine, the embodiment of the invention provides all multicast groups in the first list to the second port into which the virtual machine is migrated, so that the list of multicast groups corresponding to the second port, namely, the second list, contains all multicast groups in the first list. Since the first list certainly contains therein the multicast groups the migrated virtual machine joins while the second list is updated to contain all multicast groups in the first list, then inevitably, the multicast groups corresponding to the second port now contain therein multicast groups the migrated virtual machine needs. Thus, when the switch distributes multicast data packets according to the correspondence list of multicast group and port, it will send data corresponding to the multicast groups in the first list also to the second port; accordingly, the virtual machine migrated into the second port may obtain multicast data needed continuously, without disruption of service due to the migration.

In order to make the second list contain all multicast groups in the first list, in one embodiment, step (34) comprises adding all multicast groups in the first list directly into the second list. In another embodiment, in order to avoid adding the same multicast group repeatedly, step (34) comprises judging whether each multicast group in the first list has been contained in the second list; then, adding multicast groups not contained in the second list into the second list.

In the example of FIG. 5, the second list initially contains IP11, IP21 and IP41. Through the above step (34), port 2 obtains multicast groups in the first list corresponding to port 1, such as IP11, IP12, IP21, IP31 and IP32, and includes these multicast groups into the second list. According to one embodiment, since the second list already has IP11 and IP21, only other multicast groups in the first list are added into the second list. Thus, the second list updated through step (34) includes IP11, IP12, IP21, IP31, IP32 and IP41.

It may be appreciated that the first list indicates the multicast groups corresponding to the first port, including not only multicast groups the migrated specific virtual machine joins, but also multicast groups other virtual machines in the first port join. After the specific virtual machine leaves the first port through migration, the first port no longer needs multicast group data related to the specific virtual machine. On the other hand, after the second list is updated through step (34), the second list also contains the multicast groups the other virtual machines join. However, in fact, only the specific virtual machine is migrated into the second port, the other virtual machines are not migrated. Therefore, the second port does not actually need multicast group data related to these other virtual machines. For example, in the example of FIG. 5, after VM1 is migrated into port 2, port 1 no longer needs multicast groups IP11, IP12 and IP13 VM1 joins. On the other hand, the modified second list further contains multicast groups IP21, IP31 and IP32 of VM2 and VM3 carried by port 1 in addition to multicast groups of virtual machines VM1, VM4 and VM5 carried by port 2. However, since VM2 and VM3 still stay in port 1, port 2 does not need multicast group data related to VM2 and VM3. To this end, in the next step (36), undesired multicast groups in the first list and/or the second list are aged to be invalid, so as to prevent these unneeded multicast groups from bringing unnecessary traffic pressure to ports.

In one embodiment, step (36) is executed through a conventional group member query. Specifically, according to the existing group membership protocol, such as IGMP protocol, the switch periodically sends a group member query, and virtual machines receiving the query reply to the query by sending a group member report. Through such conventional query and reply, the switch may determine a multicast group without a reply on a certain port as multicast group the port no longer needs, and then make it expire. However, in the existing group membership protocol, sending a query by the switch, making a reply by virtual machines, and the like, are performed with a relatively long default time intervals, and thus the aging of multicast groups takes a long time. To this end, the embodiment of the invention further provides a quick aging mechanism to execute the above step (36).

Figure 6:
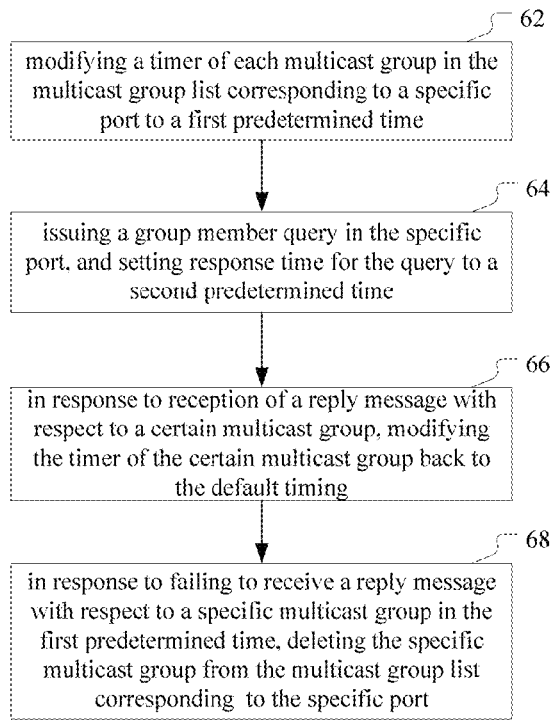
FIG. 6 depicts a flow chart illustrating a process for a quick aging mechanism according to an embodiment of the present invention.

FIG. 6 shows a flow chart of a quick aging mechanism according to an embodiment of the present invention, for aging an undesired multicast group on a port. As shown in FIG. 6, in order for a quick aging, in step (62), a timer of each multicast group in a list of multicast groups corresponding to a specific port is modified to a first predetermined time less than a default timer interval. In one embodiment, it is judged first before step (62) whether the remaining time of current timer of each multicast group is greater than the first predetermined time; if so, then the modification is performed; and if the remaining time of the current timer is less than or equal to the first predetermined time, the modification may not be performed. Then, in step (64), a group member query for multicast group is issued in the specific port, and the response time for the query is set to a second predetermined time less than a default response time. It may be appreciated that the group member query is issued in the form of a query message. The query message consists of a plurality of fields, including response time field for instructing receivers of the message to reply within the response time specified by the field. Therefore, step (64) may set the response time by modifying the response time field in the query message. Then, in step (66), in response to reception of a reply message with respect to a certain multicast group within the second predetermined time, the timer of this multicast group is modified to the default timer interval. It may be appreciated, if a reply message with respect to a certain multicast group is received, there are certainly virtual machines in the current port still belonging to the certain multicast group, namely, the multicast group still has valid members in the port. Therefore, the multicast group is a multicast group still needed by the port, and should not be aged. Thus, in step (66), the timer of the certain multicast group is modified back to its default value, for subsequent conventional query and reply. On the other hand, in step (68), in response to failing to receive a reply message with respect to a specific multicast group within the first predetermined time, the specific multicast group is deleted from the list of multicast groups corresponding to the specific port. This is because, if a reply message with respect to the specific multicast group is not received, there is no virtual machine in the current port to reply with respect to the specific multicast group, that is to say, the multicast group does not have any virtual machine as its valid member. Accordingly, the port needs the multicast group no longer, whereby, in step (68), the multicast group is immediately deleted from the list of multicast groups of the port.

It may be appreciated that the first predetermined time is a time period for judging whether a multicast group still has a valid member, and then, the first predetermined time should allow valid multicast group members to reply in time. Therefore, the first predetermined time shall be greater than or equal to a query response time, i.e., the second predetermined time. In one embodiment, the first predetermined time is set equal to the second predetermined time. In another embodiment, the first predetermined time is set slightly greater than the second predetermined time to allow possible delays of virtual machines in the process of receiving queries and making reply. According to the above two embodiments, in the duration of the first predetermined time, only one query is made to quickly determine undesired multicast groups. In yet another embodiment, to further consider the possibility of packet loss, the first predetermined time is set to be the second predetermined time multiplied by the number of queries n. Thus, within the first predetermined time, step (64) may be executed repetitively for n queries. For any one query, if a reply message with respect to a certain multicast group is received within the second predetermined time, the timer of this certain multicast group is modified back to the default timer interval. Only when the first predetermined time elapses and no reply is received for n queries, the specific multicast group is determined as an undesired multicast group. Thus, wrong judgment caused by data loss may be avoided.

In the case of the IGMP protocol, the default timer interval of the multicast group is 260 s, and the default response time for query is 10 s. In order for a quick aging, in one embodiment, the second predetermined time, namely, the query response time, is set to a default value of QAQI (quick aging query interval), 2 s. As mentioned before, for quick determination, the first predetermined time may be set equal to the second predetermined time QAQI. Further, in the IGMP protocol, there is provided Robustness Variable RV to allow data loss of a certain probability. The greater an expected data loss probability of a subnet related to port, the greater value the Robustness Variable RV is set. The default value for RV is 2. Considering robustness, in one embodiment, the query number n described before may be set to the Robustness Variable RV of the subnet related to the specific port. So, in a case where the second predetermined time is set to QAQI=2 s and RV uses its default value, the first predetermined time is set to QAQI*RV=4 s. In such case, two queries are allowed within the first predetermined time. Only when no reply message is received for the two queries, the corresponding multicast group is deleted. It may be appreciated, although the specific examples of the first predetermined time and second predetermined time settings have been given hereinabove, specific values of the first predetermined time and second predetermined time may be set according to needs, not limited to the values listed in the above examples.

By applying the quick aging mechanism shown in FIG. 6 to the first port and/or second port, respectively, step (36) described before may be implemented, namely, undesired multicast groups in the first list and/or second list are aged. Specifically, by setting the specific port as the first port to execute steps in FIG. 6, undesired multicast groups in the first list may be aged, and by setting the specific port as the second port to execute steps in FIG. 6, undesired multicast groups in the second list may be aged. In fact, the undesired multicast groups in the first list correspond to the multicast groups the migrated virtual machine joins, and the undesired multicast groups in the second list correspond to other multicast groups added in step (34) than those multicast groups the migrated virtual machine joins. However, when aging the undesired multicast groups in step (36), the switch only judges whether a multicast group is still needed by, for example, issuing a query message and receiving a reply message, as shown in FIG. 6, without logically distinguishing the correspondence relationship between multicast group and virtual machine.

In one embodiment, in step (36), the quick aging mechanism shown in FIG. 6 is executed with respect to the first and second port in parallel; and in another embodiment, quick aging is performed with respect to the first and second port sequentially. Or, in yet another embodiment, the above quick aging is performed only with respect to the first or second port. It may be appreciated that in the process of performing quick aging with respect to the first and/or second port, parameter settings, namely, settings of the first predetermined time and second predetermined time, with respect to the two ports may be the same, or alternatively may be different. By aging and making invalid undesired multicast groups in step (36), unnecessary traffic on the first port and second port may be avoided. After that, the switch and the virtual machine may work normally.

Through the above steps (32)-(36), synchronization of multicast groups during migration of the virtual machine is implemented. Based on such synchronization, the virtual machine may immediately receive desired multicast group data at the new port, without disruption of service due to the migration. However, as mentioned before, process steps of steps (32)-(36) are applicable to migration of the virtual machine within a same switch, for example virtual machine VM1 in FIG. 1 migrated from server A to server B under a same switch. If virtual machine VM1 is migrated from server A to server C, then the connected switch also changes, which belongs to the case of migration across switches.

Figure 7:
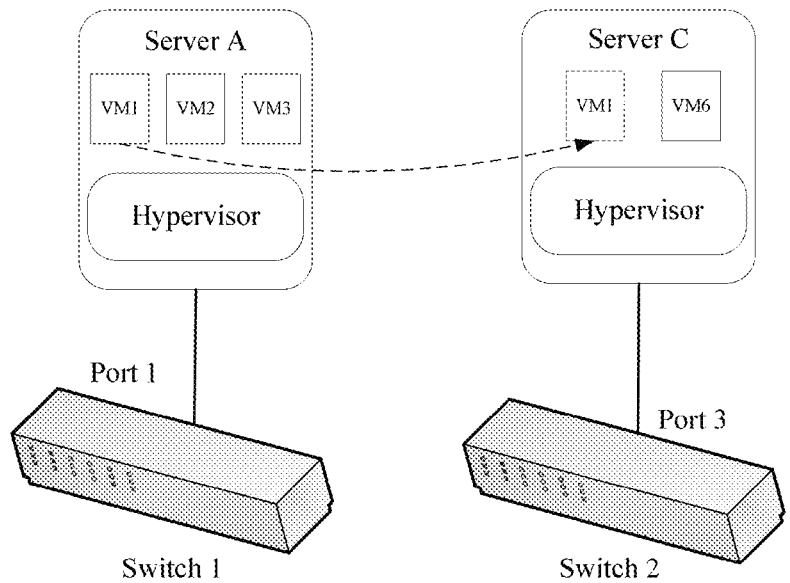
FIG. 7 depicts a schematic diagram of migration of a virtual machine across switches.

FIG. 7 shows a schematic diagram of migration of a virtual machine across switches more clearly. Specifically, FIG. 7 only shows servers A and C, and the virtual machine and switch associated therewith in FIG. 1, and assumes that virtual machine VM1 is migrated from server A to server C. Since server A is connected to the switch 1 through port 1 and server C is connected to the switch 2 through port 3, in terms of network setting, the migration of virtual machine VM1 from server A to server C corresponds to migration from switch 1 to switch 2. According to the existing technology, in the case of migration of the virtual machine to a different switch, the new switch is unable to know from which port of which switch the virtual machine comes, never to mention information of multicast groups the virtual machine joins. Therefore, as shown in FIG. 4, for migration across switches, different step (38) needs to be performed.

Figure 8:
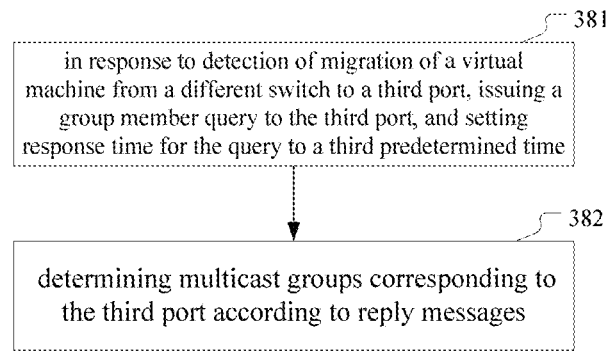
FIG. 8 depicts a flow chart illustrating a process for synchronizing multicast groups according to one embodiment.

FIG. 8 shows a flow chart of synchronizing multicast groups in the case of migration across switches according to one embodiment, namely, substeps of step (38). As shown in FIG. 8, in step (81), in response to detection of migration of a virtual machine from a different switch to a third port, a group member query for multicast group is issued to the third port, and response time for query is set to a third predetermined time, which is less than the default response time. It may be appreciated that the new switch into which the virtual machine is migrated may easily detect the migration of the virtual machine and determine the port to which the virtual machine is connected. Here, the port of the new switch to which the virtual machine is connected after migration is called the third port. Based on determining that the virtual machine is connected to the third port, a group member query is issued to the third port. As mentioned before, a query message of the group member query contains Response Time field to indicate to a receiver the allowed maximum response time. In step (81), by modifying the field, the response time for query may be set to the third predetermined time less than the default response time, thereby prompting the receiver to reply quickly. In the example of FIG. 7, the third port corresponds to port 3 of switch 2. Once detecting VM1 moving in, switch 2 issues a group member query to port 3.

Then, in step (82), according to the reply message received, multicast groups corresponding to the third port are determined. It may be appreciated that, after receiving the group member query issued in step (81), each virtual machine carried by the third port will reply within the third predetermined time. In general, a reply message sent by a virtual machine contains an identifier of a multicast group it joins. After obtaining response messages sent by respective virtual machines, by extracting multicast group identifiers therein, the switch may determine multicast groups corresponding to the third port. In general, the switch will not analyze the correspondence relationship between virtual machine and multicast group. Therefore, in step (82), the switch merely determines multicast groups corresponding to the third port based on reply messages received from the third port, but does not need to care about which multicast group thereof corresponds to the virtual machine newly migrated to a third port. This is because the virtual machine has been migrated to the third port, and thus the list of multicast groups obtained through query and reply with respect to the third port certainly contains multicast groups needed by the virtual machine newly migrated to a third port. As long as multicast data packets are provided to the third port according to this list, the virtual machine newly migrated into may certainly obtain desired multicast service data. For example, in the example of FIG. 7, through issuing query at port 3, both virtual machines VM1 and VM6 will reply. Accordingly, the multicast groups of the third port determined in step (82) contain the multicast groups VM1 joins and the multicast groups VM6 joins. As long as data of these multicast groups are provided to port 3, VM1 may certainly obtain desired multicast service data.

In one embodiment, considering the possibility of packet loss, the above steps (81) and (82) are repeated to guarantee accurately obtaining the multicast groups corresponding to the third port.

Since the query in step (81) may be issued immediately in response to the migration of the virtual machine, the time during which multicast service of the virtual machine is "disrupted" mainly depends on the time for each virtual machine to make a reply, i.e., the third predetermined time. As mentioned before, in the IGMP protocol, the default response time for query is 10 s. More specifically, the response time defined in the Response Time field in the query message is expressed as a value in unit of 1/10 second. Accordingly, in a default state, the value in the Response Time field is 100, which corresponds to 10 s. In order to make the time for virtual machine multicast service being disrupted as short as possible, the third predetermined time may be set to a minimum value 1 allowed by the above field, namely, 0.1 s. In this case, the switch may determine the multicast groups corresponding to the third port in 0.1 s, and then provide multicast data, whereby greatly reducing the time of multicast service disruption.

In another embodiment, in step (81), the format of the query message is modified, thereby setting the third predetermined time to 0, that is to say, instructing the receiver to make a reply immediately. In such embodiment, it further needs to modify a module related to multicast service in the virtual machine so that the virtual machine can recognize the modified query message format and make the reply in accordance with the response time specified in the new format. According to the embodiment, in response to the migration of the virtual machine, the switch immediately issues a query and each virtual machine immediately makes a reply, whereby the multicast service of the migrated virtual machine is almost undisrupted.

According to steps shown in FIG. 8, in the case of migration of the virtual machine across switches, through quick query and reply, the switch may provide desired multicast data packets to respective virtual machines within a predetermined short time; accordingly, the time for the multicast service of the migrated virtual machine being disrupted is greatly shortened.

Process steps of synchronizing multicast groups of a virtual machine when the virtual machine is migrated within a same switch and across switches are described, respectively, in combined with the specific examples above. Although the above description is combined with characteristics of the currently common IGMP protocol, it may be appreciated that the method of the embodiment of the present invention is not limited to systems to which the IGMP protocol is applied. In the case of other similar protocols, the above method may be executed similarly by modifying parameters and the like within the scope of the innovation, to synchronize multicast groups of the virtual machine during the migration of the virtual machine.

Figure 9:
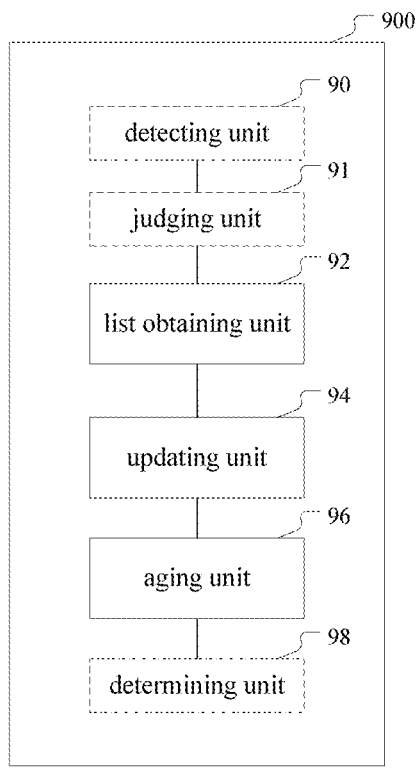
FIG. 9 depicts a schematic block diagram of an apparatus for synchronizing multicast groups according to an embodiment of the present invention.

Based on the same inventive concept, the embodiment of the invention further provides an apparatus for synchronizing multicast groups during migration of a virtual machine. FIG. 9 shows a schematic block diagram of an apparatus for synchronizing multicast groups according to an embodiment of the present invention. In FIG. 9, the apparatus is denoted as (900) as a whole. As shown in the figure, the apparatus (900) for synchronizing multicast groups is shown comprising a list obtaining unit (92), an updating unit (94), and an aging unit (96). The list obtaining unit (92) is configured to obtain, in response to detection of migration of the virtual machine from a first port to a second port of a same switch, a first list and a second list indicating multicast groups corresponding to the first port and second port respectively. The updating unit (94) is configured to update the second list, so that the second list contains the multicast groups in the first list. The aging unit (96) is configured to age an undesired multicast group in the first list and/or the second list.

According to one embodiment, the apparatus (900) further includes (denoted by dashed lines) a detecting unit (90) configured to detect the migration of the virtual machine and a judging unit (91) configured to judge whether the migrated virtual machine is from the same switch.

According to one embodiment, the updating unit (94) is configured to judge whether a multicast group in the first list has been contained in the second list and add only multicast groups not contained in the second list into the second list.

According to one embodiment, the aging unit (96) comprises a first modifying module, a querying module, a second modifying module, and a deleting module. The first modifying module is configured to modify a timer of a multicast group in a list of multicast groups corresponding to a specific port to a first predetermined time, which is less than a default timer interval. The querying module is configured to issue a group member query in the specific port, and to set response time for the group member query to a second predetermined time, which is less than a default response time. The second modifying module is configured to modify, in response to reception of a reply message with respect to a certain multicast group within the second predetermined time, the timer of the certain multicast group back to the default timer interval. The deleting module is configured to delete, in response to failing to receive a reply message with respect to a specific multicast group after the first predetermined time elapses, the specific multicast group from the list of multicast groups corresponding to the specific port, wherein the specific port is the first port and/or second port.

In one embodiment, the querying module is configured to modify the response time to the second predetermined time by modifying Response Time field in a query message of the group member query.

In one embodiment, the first predetermined time is set as the second predetermined time multiplied by number of queries n. Accordingly, the querying module is configured to issue n group member queries within the first predetermined time.

According to one embodiment, the number of queries n is set as a Robustness Variable RV of a subnet related to the specific port.

According to one embodiment, the apparatus (900) further comprises a determining unit 98 (denoted by dashed line) configured to issue, in response to detection of migration of the virtual machine from a different switch to a third port, a group member query for multicast group in the third port, and set response time for the group member query to a third predetermined time, which is less than a default response time; and determine multicast groups corresponding to the third port according to the received reply message.

In one embodiment, the third predetermined time is set as a minimum value allowed by the response time field contained in a query message of the group member query.

In one embodiment, the apparatus (900) is included in the switch. In another embodiment, the apparatus (900) is a stand-alone tool communicating with the switch.

The details of executing the apparatus (900) for synchronizing multicast groups of a virtual machine may be further obtained by referring to the description of the method in combination with the specific examples.

With the method and apparatus of the embodiments of the invention, in the case of migration of a virtual machine, multicast groups of the virtual machine may be quickly synchronized, thereby preventing the multicast service of the virtual machine from being disrupted, or reducing the time of disruption.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

I claim:

1. An apparatus for synchronizing multicast groups during migration of a virtual machine, the apparatus comprising:
a processing device in communication with memory; and
tools in communication with the memory, the tools comprising:
a list obtaining unit configured to obtain, in response to detection of migration of the virtual machine from a first port to a second port within a first switch, a first list indicating multicast groups corresponding to the first port and a second list indicating multicast groups corresponding to the second port, wherein the virtual machine is associated with a first server, and wherein the first server is in communication with the first switch via the first port;
an updating unit configured to update the second list so that the second list contains the multicast groups in the first list; and
an aging unit configured to age an undesired multicast group, wherein the aging unit comprises:
a first modifying module configured to modify a timer of the multicast groups in a list of multicast groups corresponding to a specific port to a first predetermined time, wherein the specific port is one of the first and second ports, and wherein the first predetermined time is less than a default time interval;
a querying module configured to issue a group member query for the multicast groups in the specific port, and to set a response time for the group member query to a second predetermined time, wherein the second predetermined time is less than a default response time;
a second modifying module configured to modify, in response to reception of a reply message with respect to a certain multicast group within the second predetermined time, the timer of the certain multicast group back to the default time interval; and
a deleting module configured to delete, in response to failing to receive the reply message with respect to a specific multicast group after the first predetermined time elapses, the specific multicast group from the list of multicast groups corresponding to the specific port.

2. The apparatus of claim 1, wherein the updating unit is further configured to add any multicast groups not contained in the second list into the second list.

3. The apparatus of claim 1, wherein the querying module is further configured to modify the response time to the second predetermined time by modifying a response time field in a query message of the group member query.

4. The apparatus of claim 1, wherein the first predetermined time is set as the second predetermined time multiplied by a number of queries, and wherein the querying module is further configured to issue at least one group member queries for the first multicast group within the first predetermined time.

5. The apparatus of claim 4, wherein the number of queries is set as a robustness variable of a subnet related to the specific port.

6. The apparatus of claim 1, further comprising a determining unit configured to:
issue, in response to detection of migration of the virtual machine from a different switch to a third port, a group member query for multicast groups in, wherein the third port is a port within a second switch;
set a response time for the group member query to a third predetermined time less than a default response time; and
determine multicast groups corresponding to the third port according to a reply message received within the third predetermined time.

7. The apparatus of claim 6, wherein the third predetermined time is set as a minimum value allowed by a response time field contained in a query message of the group member query.

8. The apparatus of claim 1, wherein the first server is in communication with a virtual machine network via the first switch.

9. A computer program product to synchronize multicast groups during migration of a virtual machine, the computer program product comprising computer readable memory having program code embodied therewith, the program code executable by a processing unit to:
obtain, in response to detection of migration of the virtual machine from a first port to a second port of a first switch, a first list indicating multicast groups corresponding to the first port and a second list indicating multicast groups corresponding to the second port, wherein the virtual machine is associated with a first server, and wherein the first server is in communication with the first switch via the first port;
update the second list so that the second list contains the multicast groups in the first list; and
age an undesired multicast group, wherein aging the undesired multicast group comprises program code to:
modify a timer of at least one multicast group in a list of multicast groups corresponding to a specific port to a first predetermined time, wherein the specific port is one of the first and second ports, and wherein the first predetermined time is less than a default time interval;

issue a group member query for the multicast groups in the specific port, and set a response time for the group member query to a second predetermined time, wherein the second predetermined time is less than a default response time;

in response to reception of a reply message with respect to a certain multicast group within the second predetermined time, modify the timer of the certain multicast group back to the default time interval; and in response to failing to receive the reply message with respect to a specific multicast group after the first predetermined time elapses, delete the specific multicast group from the list of multicast groups corresponding to the specific port.

10. The computer program product of claim 9, wherein updating the second list further comprises program code to add any multicast groups not contained in the second list into the second list.

11. The computer program product of claim 9, further comprising program code to modify the response time to the second predetermined time by modifying a response time field in a query message of the group member query, responsive to the group member query.

12. The computer program product of claim 9, wherein the first server is in communication with a virtual machine network via the first switch.

13. The computer program product of claim 11, further comprising program code to issue at least one group member query for the first multicast group within the first predetermined time, wherein the first predetermined time is set as the second predetermined time multiplied by a number of queries.

14. The computer program product of claim 13, wherein the number of queries is set as a robustness variable (RV) of a subnet related to the specific port.

15. The computer program product of claim 9, further comprising program code to:

issue, in response to detection of migration of the virtual machine to a port within a second switch from a different switch, a group member query for multicast groups in the third port;

set a response time for the group member query to a third predetermined time less than a default response time; and determine multicast groups corresponding to the third port according to a reply message received within the third predetermined time.

16. The computer program product of claim 15, wherein the third predetermined time is set as a minimum value allowed by a response time field contained in a query message of the group member query.

* * * * *